Jan. 18, 1938.   D. R. HILLIS   2,105,595
LUBRICATING SYSTEM
Filed Oct. 15, 1934

INVENTOR.
David R. Hillis
ATTORNEYS

Patented Jan. 18, 1938

2,105,595

UNITED STATES PATENT OFFICE 2,105,595

LUBRICATING SYSTEM

David R. Hillis, Detroit, Mich., assignor to The Farval Corporation, Cleveland, Ohio, a corporation of Ohio Application October 15, 1934, Serial No. 748,360

10 Claims. (Cl. 184—7)

The present invention relates to a lubricating system in which lubricant is adapted to be transferred from a main pressure source and distributed through suitable conduits to a series of measuring valves whereby a measured quantity of lubricant is positively and periodically supplied to desired points of lubrication such as bearings and the like. The lubricating system which constitutes the subject matter of my invention may be practically termed a "dual line progressive system" inasmuch as the use of a double line of distributing conduits is contemplated and the individual measuring valves are so constructed whereby the measured quantity of lubricant is first discharged from each valve in the series and the excess circulating lubricant is then transferred to the next in the series of valves. Such construction enables a relatively simple and compact design for not only the system as a whole but also the individual measuring valves.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
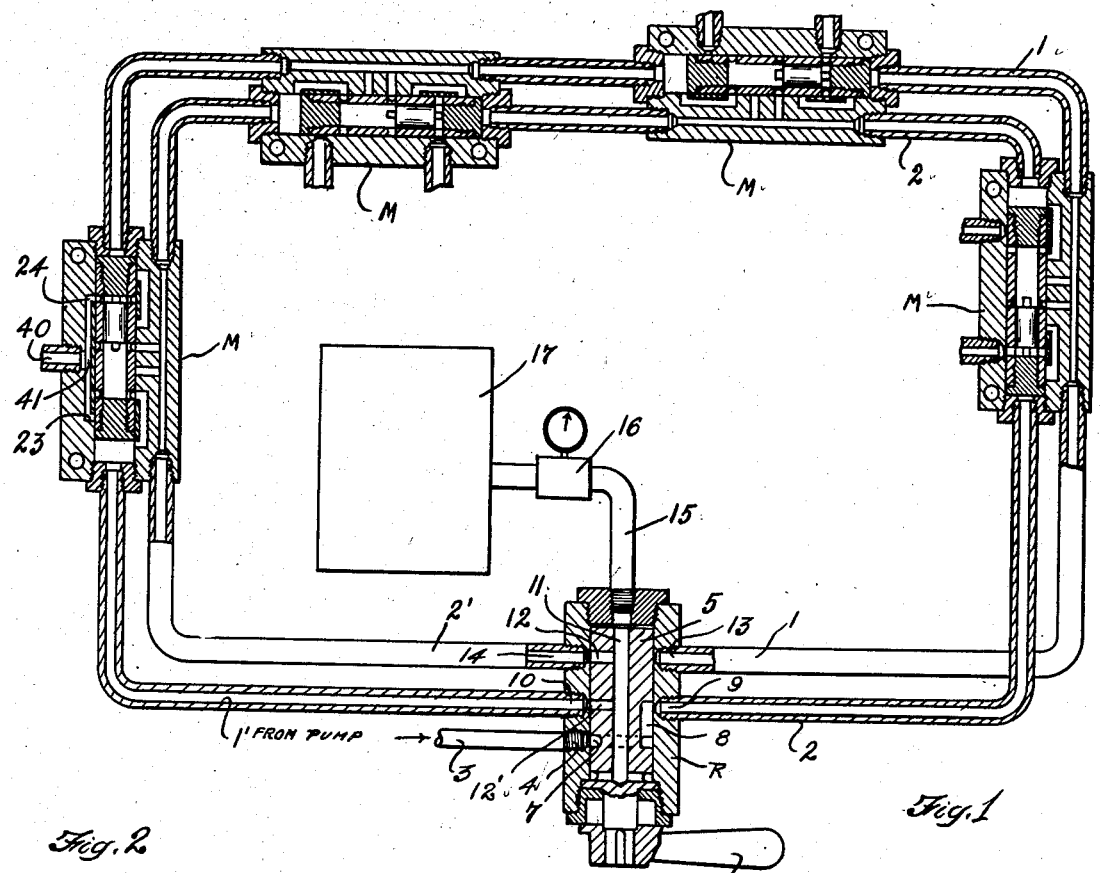
Figures 2, 3:
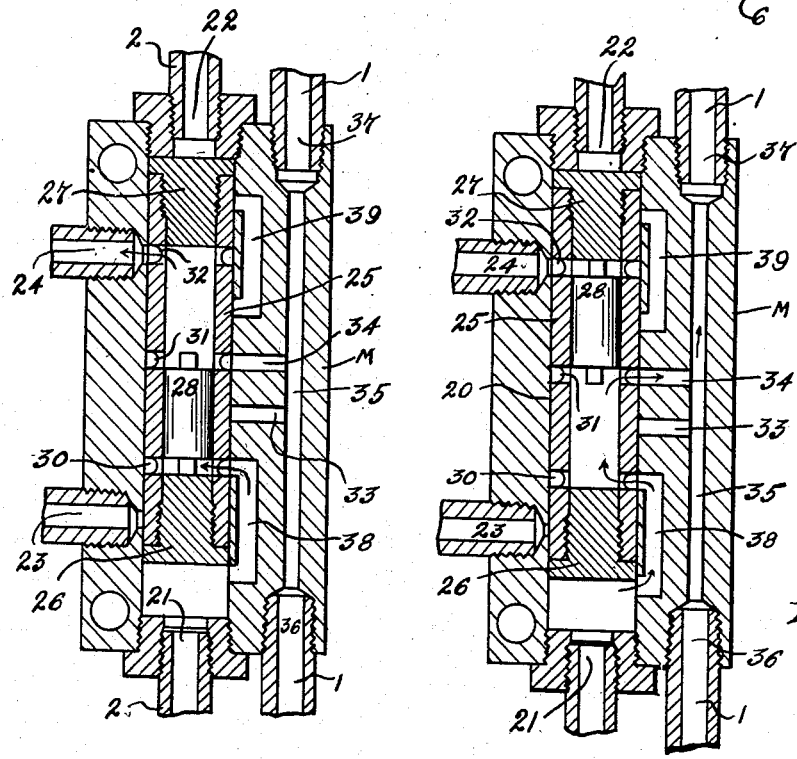

In said annexed drawing:

Fig. 1 is a sectional view illustrating the general layout of the lubricating system constructed according to the principles of my invention; Figs. 2 and 3 are enlarged sectional views of an individual measuring valve showing the parts thereof in various positions of operation.

Now referring more particularly to Fig. 1, the system consists essentially of the control or flow directing valve R and the measuring valves M, interconnected by means of the dual conduits I and 2 respectively. The conduit 3 leads from a lubricant pressure source such as a pump (not shown) to the port 4 in the cylindrical casing of the valve R. The interior of the valve R is occupied by a cylindrical cock 5 which is rotatable therein by means of the operating handle 6. An annular groove 7 in the outer periphery of the cock 5 registers with the port 4 and an axially extending groove 8 leads from the groove 7 to a point of registry with the port 9 to which the conduit 2 is connected, or the port 10 to which the return end 1' of the conduit 1 is connected. A central bore 11 in the cock 5 connects with the radially extending bores 12 and 12'. The bore 12 is positioned in a line to register with the port 13 of the conduit 1 or the port 14 of the return end 2' of the conduit 2. The bore 12' is positioned in a line to register with the port 10 of the conduit 1' or the port 9 of the conduit 2. The central bore 11 is in turn connected to the conduit 15 leading to the flow indicator 16 and the reservoir 17.

Thus, when the parts of the flow directing valve R are in the position as shown in Fig. 1, lubricant will be led from the pressure pump through the port 4, the groove 7, the groove 8, the port 9 to the conduit 2. The return end 2' of the conduit 2 and the conduit 1' will be placed in communication with the central bore 11 through the radial bore 12. The conduit 1 will obviously be closed. In this manner lubricant under pressure will be conducted through the conduit 2 to the first of the series of measuring valves M whose construction will now be more particularly described.

The measuring valve M includes a valve chamber 20 with which the inlet ports 21 and 22, and the discharge ports 23 and 24 communicate. A piston valve 25 is adapted to reciprocate within the valve chamber 20. Plugs 26 and 27 close the ends of the hollow interior of the piston valve 25. A solid piston 28 is in turn slidably carried within the hollow interior of the piston valve 25. A plurality of openings or ports 30, 31 and 32 are positioned in corresponding circumferential grooves in the wall of the hollow piston valve 25. Passages 33 and 34 lead from the valve chamber 20 to the passage 35 connecting the outlet ports 36 and 37 respectively. The passage 35 constitutes, in effect, an unimpeded continuation and through connection of the conduit 1. By-pass passages 38 and 39 are also provided in the wall of the valve chamber 20 at points located substantially adjacent the ends of the piston valve 25.

The operation of the above described system and more particularly the individual measuring valves M is as follows:—

Lubricant under pressure is delivered to the feed line 2 by reason of the fact that the valve R is in the position shown in Fig. 1 as has already been described. Such lubricant bears against the end plug 26 of the piston valve 25 and forces it to the position shown in Fig. 2. When the piston valve 25 has reached this latter position, lubricant is then transferred through the by-pass 38, through the openings 30 to the interior of the piston valve 25. Further movement and pressure of lubricant then forces the solid piston 28 to the position shown in Fig. 3 whereby a measured quantity of lubricant is ejected through the openings 32 and out through the discharge port 24 to the desired point of lubrication. After the piston 28 has completed its travel and reached the position as shown in Fig. 3, the openings 31 will have been cleared and lubricant which is still under pressure then flows out through the openings 31, the passage 34 and the passage 35 to the conduit 1 and thence to the next of the series of measuring valves M wherein the above described operation is repeated.

Due to the fact that the end of the conduit 1, as shown in Fig. 1, is closed, lubricant cannot travel backwards through such conduit, but the only permissible path of flow is in the opposite direction to the next of the series of measuring valves M.

After lubricant has traversed the entire series of measuring valves M, as just described, it will pass through the return conduit 2', through the port 14, the passage 12, the central bore 11, the conduit 15, the flow indicator 16 and thence to the reservoir 17. In this manner the operator upon inspecting the flow indicator 16 will be apprised of the fact that the entire circuit has been completed and that each valve has discharged its measured quantity of lubricant, since it is necessary that each valve M discharge its measured quantity before lubricant flow can continue.

The conduit 1' is connected to relief and the reservoir 17 through the port 10 of the bore 12', the central bore 11 and the conduit 15. In this manner lubricant which is displaced from the space adjacent the end of the piston valve 25 in the last of the series of measuring valves M may be properly transferred. In a similar manner, lubricant between the end of the piston valve 25 in the first of the series of measuring valves M (in a counterclockwise direction with respect to Fig. 1) will be displaced through the conduit 2 to the third valve M, and movement of the piston 25 in such third valve M in turn displaces lubricant through the conduit 2' to relief and the reservoir 17, through ports 14, 12, and 11. A similar lubricant movement occurs through the second and fourth of the series of measuring valves M and thence to relief through the conduits 1', ports 12' and 11.

A reversal of the handle 6 of the control valve R through an angle of 180° will correspondingly reverse the connections to the conduits 1, 2, 1', and 2' with the result that lubricant will be caused to flow in a reverse direction out through the conduit 1' and return through the conduit 1. The manner of operation of the measuring valves M of course will remain the same.

It should also be noted that instead of having two separate discharge ports 23 and 24 in the measuring valve M that it is possible to provide but a single discharge conduit 40 by means of connecting the ports 23 and 24 with a passage 41 as shown in Fig. 1. It should also be noted that the lubricant pressure alternates between the conduits 1 and 2 as it passes from one measuring valve M to the next in the series. In other words, the inlet ports and outlet ports of each measuring valve M are connected in alternately reverse order to the conduits 1 and 2.

It will also be seen that the control valve R functions to supply pressure to one of the conduits, close another and to simultaneously connect the opposite ends of both of the conduits to relief; similarly the conduits 1' and 2 will always be feed line conduits and the conduits 2' and 1 will always be return line conduits. Furthermore, a review of the foregoing system in its mode of operation will show that it at all times insures a positive action by reason of the fact that each one of the measuring valves M must discharge its measured quantity of lubricant before lubricant flow will be permitted to continue on through the conduits.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a lubricating system, the combination of a pressure source, dual conduits connected to said source, a control valve for alternately opening one of said conduits to said pressure source and closing the other of said conduits, and a series of measuring valves connected to said conduits, each of said valves having discharge ports and receiving lubricant from one of said conduits and being adapted to discharge a measured quantity of lubricant through one of said ports and then to conduct lubricant flow to the other of said conduits.

2. In a lubricating system, the combination of a pressure source, dual conduits connected to said source, a control valve for opening one of said conduits and closing the other, and a series of measuring valves connected to said conduits, each of said conduits having an unimpeded and through connection at each alternate measuring valve, said valves being adapted to discharge a measured quantity of lubricant and then to conduct lubricant flow to the other of said conduits.

3. In a lubricating system, the combination of a pressure source, a control valve connected to said pressure source, dual conduits leading from and terminating at said control valve, said valve being adapted to open one end of one of said conduits and to relieve the opposite ends of both conduits, and a series of measuring valves connected across said conduits, each of said valves being adapted to discharge a measured quantity of lubricant and then to conduct lubricant flow to the other of said conduits to operate the next valve in said series.

4. In a lubricating system, the combination of a pressure source, a control valve connected to said pressure source, dual conduits leading from and terminating at said control valve, said valve being adapted to open one end of one of said conduits and to close one end of the other of said conduits, and to relieve the opposite ends of both conduits, and a series of measuring valves connected across said conduits, each of said valves being adapted to discharge a measured quantity of lubricant and then to conduct lubricant flow to the other of said conduits to operate the next valve in said series.

5. In a lubricating system, the combination of a pressure source, dual conduits connected to said source, and a series of measuring valves each having a dual pair of ports, one pair of ports of one of said valves being connected to one of said conduits and the corresponding pair of ports of the next adjacent valve in said series being connected to the other of said conduits.

6. In a lubricating system, the combination of a pressure source, dual conduits connected to said source, and a series of measuring valves each having a dual pair of ports, one pair of ports of one of said valves being connected to one of said conduits and the corresponding pair of ports of the next adjacent valve in said series being connected to the other of said conduits, and a control valve for alternately opening one of said conduits to said pressure source and closing the other of said conduits.

7. In a lubricating system, the combination of a pressure source, dual conduits connected to said source, and a series of measuring valves each having a dual pair of ports, one pair of ports of one of said valves being connected to one of said conduits, the other pair of ports of said last named valve being connected to the other of said conduits, and the next adjacent of said valves in said series having its corresponding pairs of ports connected in reverse order to said conduits.

8. A measuring valve for a lubricating system comprising the combination of a valve chamber, a measuring chamber connected thereto, a dual pair of ports, a pair of discharge ports communicating with said valve chamber, and valve means movable in said valve chamber for initially conducting lubricant from one of one pair of said ports to said measuring chamber and for finally conducting lubricant to one of the other pair of said ports.

9. A measuring valve for a lubricating system comprising the combination of a valve chamber, a dual pair of ports in said chamber, a hollow piston valve movable in said chamber, openings in the wall of said piston valve, passages for conducting lubricant from one of one pair of said ports through said openings to the interior of said piston valve, and a piston movable in the interior of said piston valve for initially discharging a measured quantity of lubricant therefrom, and for finally connecting said last-named port to one of said other pair of ports.

10. A measuring valve for a lubricating system comprising the combination of a valve chamber, discharge ports, a dual pair of ports in said chamber, a hollow piston valve movable in said chamber, openings in the wall of said piston valve, passages for conducting lubricant from one of one pair of said ports through some of said openings to the interior of said piston valve, and a piston movable in the interior of said piston valve for initially discharging a measured quantity of lubricant from the interior of said piston valve to one of said discharge ports, said piston also being adapted to effect connections between said one of one pair of said ports and one of the other pair of said ports after the discharge of such measured quantity of lubricant.

DAVID R. HILLIS.